(12) United States Patent
Harris et al.

(10) Patent No.: US 7,139,246 B2
(45) Date of Patent: Nov. 21, 2006

(54) METHOD AND APPARATUS FOR ADJUSTING A MOBILE COMMUNICATION INACTIVITY TIMER

(75) Inventors: John M. Harris, Chicago, IL (US); Scott R. Clapp, Sleepy Hollow, IL (US)

(73) Assignee: Motorola, Inc., Schaumburg, IL (US)

( * ) Notice: Subject to any disclaimer, the term of this patent is extended or adjusted under 35 U.S.C. 154(b) by 36 days.

(21) Appl. No.: 10/879,415

(22) Filed: Jun. 29, 2004

(65) Prior Publication Data

US 2005/0287949 A1   Dec. 29, 2005

(51) Int. Cl.
*G01R 31/08* (2006.01)
(52) U.S. Cl. .................. 370/252; 370/328; 455/67.11
(58) Field of Classification Search ............... 370/252, 370/328, 335, 331; 455/67.11, 67.13, 515, 455/423–425, 452.2, 453
See application file for complete search history.

(56) References Cited

U.S. PATENT DOCUMENTS

| | | | | |
|---|---|---|---|---|
| 4,829,519 | A * | 5/1989 | Scotton et al. ............... 714/708 |
| 5,682,604 | A * | 10/1997 | Kashi et al. ................. 370/448 |
| 5,937,005 | A * | 8/1999 | Obuchi et al. ............... 375/224 |
| 6,363,267 | B1 * | 3/2002 | Lindskog et al. ............ 455/574 |
| 6,370,357 | B1 * | 4/2002 | Xiao et al. ................ 455/67.11 |
| 6,370,392 | B1 * | 4/2002 | Li et al. ...................... 455/522 |
| 6,480,476 | B1 * | 11/2002 | Willars ........................ 370/311 |
| 2002/0147022 | A1 | 10/2002 | Subramanian et al. |
| 2002/0160812 | A1 * | 10/2002 | Moshiri-Tafreshi et al. 455/561 |
| 2003/0040315 | A1 * | 2/2003 | Khaleghi et al. ............ 455/435 |
| 2003/0129962 | A1 * | 7/2003 | Chaney ....................... 455/406 |
| 2004/0081112 | A1 * | 4/2004 | Chen et al. .................. 370/318 |
| 2005/0002529 | A1 * | 1/2005 | Vannithamby ............... 380/255 |
| 2005/0009548 | A1 * | 1/2005 | Kelley et al. ................ 455/509 |
| 2005/0192046 | A1 * | 9/2005 | Harris ...................... 455/552.1 |

OTHER PUBLICATIONS

Telecommunications Industry Association, "TIA/EIA Interrim Standard for CDMA200 Series", Mar. 2000, TIA, Revision of TIA/EIA/IS-2000, pp. 1 & 2-656.*

Keshav, Srinivasan, et al. "An Empirical Evaluation of Virtual Circuit Holding Time Policies in IP-Over-ATM Networks." IEEE Journal On Selected Areas In Communications. vol. 13, No. 8. Oct. 1995 (13 pages).

* cited by examiner

*Primary Examiner*—Chau Nguyen
*Assistant Examiner*—Jung Park
(74) *Attorney, Agent, or Firm*—Simon B. Anolick

(57) ABSTRACT

A wireless communication unit communication transport path monitor (10) monitors (20) at least one wireless communication unit specific parameter, and in response a wireless communication system inactivity timer (11) is set (21) as a function, at least in part of the monitored wireless communication unit specific parameter. The inactivity timer for a given wireless communication unit tends to be shortened when a communication transport path experience is sufficiently consumptive of unit and/or system resources. Optionally, at least one wireless communication system specific parameter is monitored (22) and/or at least one fairness parameter is checked (23), and the inactivity timer is set (21) as a function at least in part of the system specific parameter(s) and the fairness parameter. Similarly, if a predetermined condition is met, the inactivity timer for a given wireless communication unit may not be shortened.

25 Claims, 3 Drawing Sheets

METHOD AND APPARATUS FOR ADJUSTING A MOBILE COMMUNICATION INACTIVITY TIMER

TECHNICAL FIELD

This invention relates generally to wireless communication systems and more particularly to systems that incorporate an inactivity timer relating to the use of a mobile communication unit.

BACKGROUND

Wireless communication systems of various kinds are known in the art. Many such systems include a method and apparatus to establish a communications link between a wireless communication unit and a telecommunications network. Many such wireless communication units typically include two principal modes of operation: active and dormant.

When a wireless communication unit is transmitting and receiving data via the telecommunications network, the wireless communication unit is typically in the active mode. While in the active mode the wireless communication unit may receive and transmit data via the telecommunications network substantially without delays resulting from establishing a connection with the telecommunications network. Maintaining an active mode of operation, however, consumes resources both for the wireless communication unit and the network. For instance, while in the active mode a wireless communication unit consumes more battery life than while in the dormant mode. Also, when in an active mode, the wireless communication unit generally consumes more resources for a given wireless communication system such as radio frequency resources, Walsh code legs, and the like than while dormant. Therefore, to conserve these system and unit resources, and typically after a predetermined amount of time during which no data or non-background data is transmitted between the wireless communication unit and the network, the wireless communication unit will automatically switch to the dormant mode. The amount of inactive time before the wireless communication unit switches to the dormant mode is typically governed by an inactivity timer.

Although use of a dormant state can conserve resources, drawbacks do exist. For example, the transition from the active mode to the dormant mode takes a certain amount of time as does the reverse transition. These transitions can result in a delay for the user of a wireless communication unit because when the user attempts to send or receive data after the inactivity timer expires, the user must wait for the unit to transition back to the active state before data can be sent or received. Therefore, a balance is usually sought between the conservation of resources through the use of a short inactivity timer and the convenience of a reduced operational delay.

Certain methods for adjusting the inactivity timer have been attempted. These methods, however, focus largely on the burdens on the wireless communication system in which several wireless communication units operate. For example, one method will adjust the inactivity timer from a uniform duration for all wireless communication units to a shorter uniform duration for all wireless communication units when the entire system's resources are overly burdened. While possibly satisfactory for some purposes, such methods can fail to take into account that resource consumption usually varies among wireless communication units due to several variables specific to these units.

BRIEF DESCRIPTION OF THE DRAWINGS

The above needs are at least partially met through provision of the method and apparatus for adjusting a mobile communication inactivity timer described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one or more wireless communication unit specific parameters that likely correspond to a transport path circumstance for a wireless communication unit are monitored. Any of several wireless communication unit specific factors can be monitored in addition to optionally checking certain predetermined conditions and system specific parameters. Then, the inactivity timer is set as a function, at least in part, of the monitored parameters and conditions.

So configured, individual circumstances for individual communication units can be dynamically accommodated. As a result, in many cases, a better mix between conservation of individual communication unit resources, system resources, access times, and user experience can be achieved.

Figure 1:
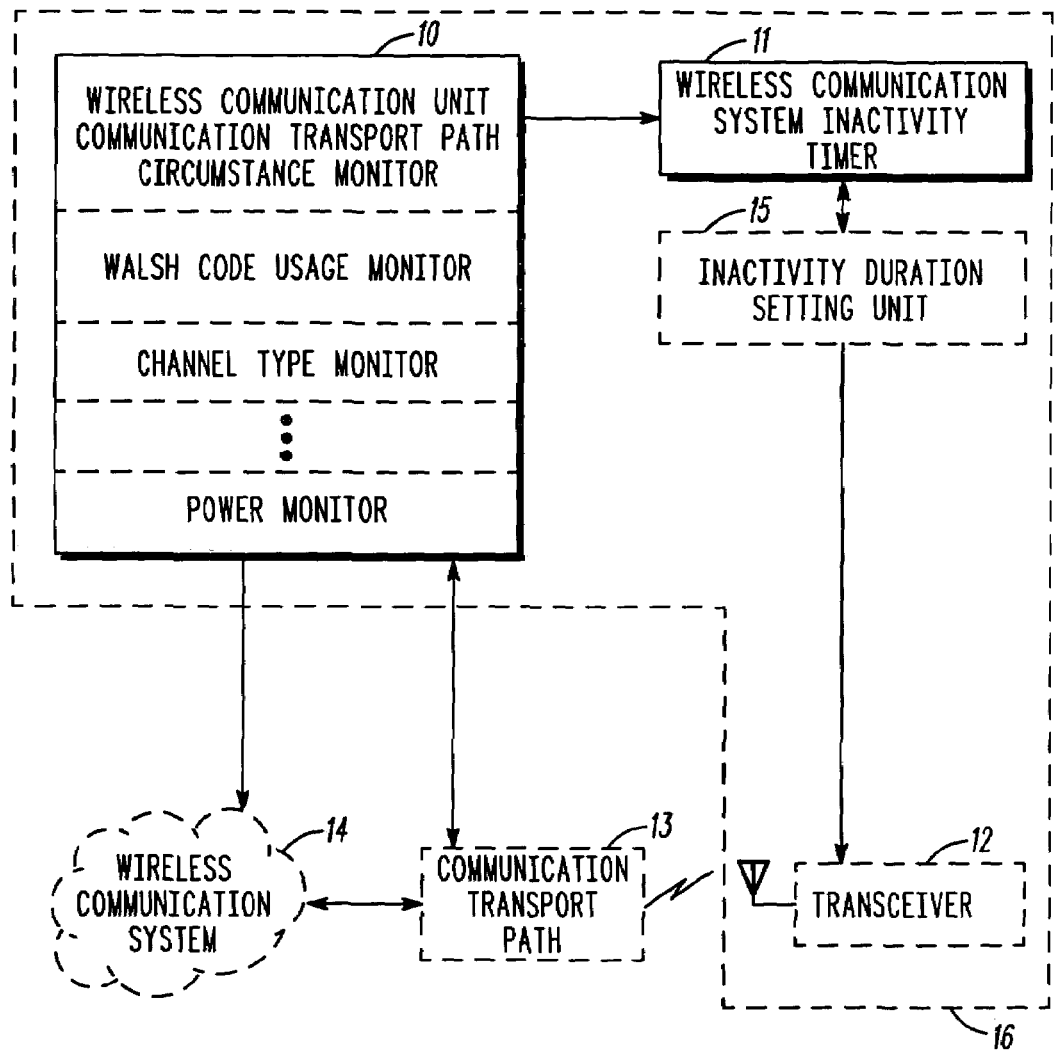
FIG. 1 comprises a block diagram as configured in accordance with various embodiments of the invention.

Referring now to the drawings, and in particular to FIG. 1, a wireless communication system inactivity timer ("inactivity timer") 11 is responsive to a wireless communication unit communication transport path circumstance monitor ("transport path monitor") 10. The transport path monitor 10 may optionally include, but is not limited to, one or more of several types of monitors such as a Walsh code usage monitor, a channel type monitor, and/or a power monitor. As indicated, other parameter monitors may optionally be provided within the scope of the transport path monitor 10. Each of these types of monitors examines a particular aspect or parameter of a communication transport path 13 between a wireless communication unit transceiver 12 and a wireless communication system 14.

One should note that to facilitate monitoring the transport path 13 for a given wireless communication unit, the transport path monitor 10 may optionally be connected to the wireless communication system whereby the transport path monitor 10 can initiate a so-called ping for the given wireless communication unit. During the ping, as known in the art, the transport path monitor 10 will monitor the various wireless communication unit specific parameters in accordance with the various embodiments of the invention. Alternatively, or in combination with the above approach, several aspects of the transport path may be directly monitored by the transport path monitor 10 such as the power with which a communication is transmitted, the signal strength for the transport path 13, the transmit power of the wireless communication unit, and the signal to noise ratio of the transport path 13.

The inactivity timer 11 may include a separate inactivity duration setting unit 15 for selecting a particular inactivity duration to use with a given wireless communication unit. The inactivity duration setting unit 15 may also be included with, or can be discrete from, the inactivity timer 11. The inactivity duration setting unit 15 selects a particular inactivity duration that reduces the inactivity duration for one or more wireless communication units that are experiencing poor transport path performance as monitored by the transport path monitor 10. In accordance with the various embodiments of the invention, the inactivity duration setting unit 15 optionally may increase or maintain the inactivity duration or timer depending on the monitored parameters as discussed below.

One should note that the transport path monitor 10, the inactivity timer 11, and the inactivity duration setting unit 15 may be embodied or configured in manners known in the art and included in the same unit 16 with the wireless communication unit transceiver 12 as indicated by the phantom lines. Alternatively, the transport path monitor 10, the inactivity timer 11, and the inactivity duration setting unit 15 may be known platforms included with the wireless communication system 14. Also, each element may be physically separate units as necessary for a given communication system. In many instances, a given communication system or unit will comprise one or more fully or partially programmable elements. In such cases, these teachings are preferably achieved through appropriate programming of such elements as will be well understood by those skilled in the art.

Figure 2:
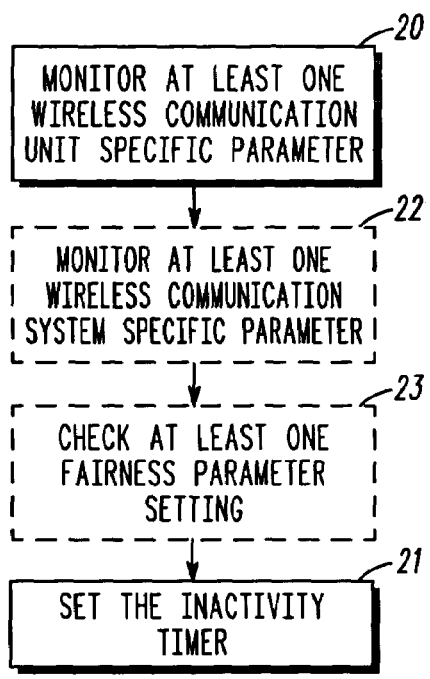
FIG. 2 comprises a flow diagram as configured in accordance with various embodiments of the invention.

A method of operation for setting an inactivity timer in accordance with the various embodiments of the invention will now be further described with reference to FIG. 2. The transport path monitor 10 will first monitor 20 at least one wireless communication unit specific parameter as likely corresponds to a communication transport path circumstance for a given wireless communication unit. Then, the inactivity timer 11 is set 21 as a function, at least in part, of the monitored wireless communication unit specific parameters. Optionally, at least one wireless communication system specific parameter may be monitored 22 and/or at least one fairness parameter may be checked 23 before setting 21 the inactivity timer.

A variety of parameters may be monitored 20 in accordance with the various embodiments of the invention. In general, any parameter relating to the efficiency and/or effectiveness of use of one or more communication resources by a wireless communication unit may be potentially usefully monitored 20. The discussion below focuses on parameters commonly used, but the invention is not limited to these listed parameters.

In one embodiment, the monitored unit specific parameter may correspond to a resource usage parameter indicating how resources are being used in connection with a wireless communication unit. Similarly, the monitored unit specific parameter may correspond to a transport path experience for a given wireless communication unit. The transport path experience also can be monitored in several ways depending on the system such as by monitoring signal strength transmissions as pertain to communications with the given wireless communication unit and/or by monitoring error rates of transmission as sourced by or received by the given wireless communication unit.

Several other factors relating to the communication transport path may optionally be monitored. For example, the transport path monitor 10 may monitor 20 a handoff rate for a given wireless communication unit and/or the potential throughput capacity as associated with at least one resource allocated for use by the given wireless communication unit. Additionally, the transport path monitor 10 may monitor 20 the number of Walsh codes allocated for use by a given wireless communication unit, a potential throughput capacity as associated with at least one Walsh code as allocated for use by a given wireless communication unit, at least one channel element ("CE") as allocated for use by the given wireless communication unit, and/or the type of transport path as allocated for use by the given wireless communication unit. The type of transport path could be any of those known in the art such as a dedicated control channel ("DCCH"), a fundamental channel ("FCH"), a radio configuration 3 channel ("RC3"), a radio configuration 4 channel ("RC4"), or a radio configuration 5 channel ("RC5"), to name a few.

In response to monitoring 20 one or more of the wireless communication unit specific parameters, the inactivity timer 11 is shortened from, increased from, or maintained at a nominal value. More specifically, the inactivity timer 11 tends to be shortened when the communication transport path circumstance for a given wireless communication unit is sufficiently consumptive of at least one communication resource to thereby conserve power consumption of the wireless communication unit. To illustrate, each of the wireless communication unit specific parameters that may be monitored tends to indicate a consumption of resources or other measure of the communication transport experience of a particular wireless communication unit. Thus, the inactivity timer can be adjusted so as to optimize the use of these resources and otherwise improve the communication transport experience for as many wireless communication units as possible. In other words, if the monitored parameter(s) indicate that the consumption of resources for a particular situation or unit is too high, the inactivity timer for that unit will tend to be shortened to free up the overly consumed resources.

For example, regarding the parameters monitored in connection with the transport path experience, the signal strength of transmissions for a particular wireless communication unit will indicate how much power is used by the unit while in the active mode. Those wireless communication units with smaller signal strengths typically consume more battery life when in an active mode than the units with larger signal strengths. Also, signal strength is often (though not always) a measure of the distance of a wireless communication unit from a wireless communication system tower (or other antenna site). Generally, wireless communication units further from the tower consume more system and unit resources than units closer to the tower. Thus, reducing the inactivity timer for the units with smaller signal strengths will conserve battery power and system resources by shortening the amount of time these overly resource consuming units stay in the resource consuming active mode.

Similarly, the error rates of transmissions sourced or received by a wireless communication unit is a measure of the resources consumed by the unit in an active mode. Therefore, tending to reduce the inactivity timer for those units with higher error rates will again conserve battery power and system resources.

In certain circumstances, however, the inactivity timer for a wireless communication unit should not be lowered. For example, a wireless communication unit that is traveling along a highway may change wireless communication system cells at a high frequency resulting in a high handoff rate. If the handoff rate is such that the unit enters a new cell every 45 seconds, if the average inactivity timer is below this level (e.g., 45 seconds), then the inactivity timer should not be adjusted as a function of the current system resource usage because no significant savings in time or resources can usefully be achieved. In other words, the inactivity timer should be adjusted based on the average resource usage over a preceding time interval, where the time interval is roughly proportional to the average system inactivity timer. Thus, if a given system is using a very long inactivity timer, and the conditions for the transport path 13 for a given wireless communication unit in that system are varying quickly, then the instantaneous conditions will not determine the inactivity timer because those conditions are unlikely to persist over the life of the inactivity timer.

Other factors influence the transport path circumstance for a wireless communication unit. In particular, an important factor for a wireless communication system is the potential throughput capacity that the system can provide for a given wireless communication unit. Depending on the system and the unit, various radio frequency resources can be used to create the communication transport path 13, and these resources help dictate the potential throughput capacity for the transport path. These frequency resources are used more heavily by wireless communication units in the active mode than when dormant; thus, changing the inactivity timer in response to these parameters can conserve frequency resources and improve the potential throughput capacity for the system and for a given wireless communication unit in the system.

More specifically, in certain situations a given transport path 13 will consume more system resources than a predetermined amount. In such situations, the inactivity timer will be shortened for those wireless communication units with a transport path 13 consuming too many resources. Examples of such situations include where a wireless communication unit uses more Walsh code space, a higher data rate, or more radio frequency capacity than a given amount.

One such resource that can be monitored is the allocation of Walsh codes for use by one or more wireless communication units. The effect of the allocation of Walsh codes can likely be better understood with reference to FIG. 3. Walsh codes are often thought of in terms of a Walsh code leg tree 30 wherein each node of the tree represents a Walsh code leg of a certain length dictated by what level of the tree it comes from that can be allocated for use by a single wireless communication unit in an active mode. Each level 31–35 of the tree represents the throughput capacity of the Walsh code legs at that level such that each successively higher level has double the throughput of the level below. For example, if the Walsh code at level 35 has a theoretical throughput capacity of 153.6 bits/s (before accounting for headers and other sources of data overhead), the Walsh code at level 34 has a throughput capacity of 76.8 bits/s. Similarly, the Walsh code at level 33 has a throughput capacity of 38.4 bits/s and so on to level 31 which has a 9.6 bits/s throughput capacity. Each Walsh code leg that is assigned at a higher level prevents any of the Walsh code legs below that assigned leg on the tree 30 from being assigned to a wireless communication unit. Similarly, each Walsh code leg assigned to a lower level prevents the assignment of any Walsh code legs above that assigned leg on the tree 30 from being assigned.

Figure 3:
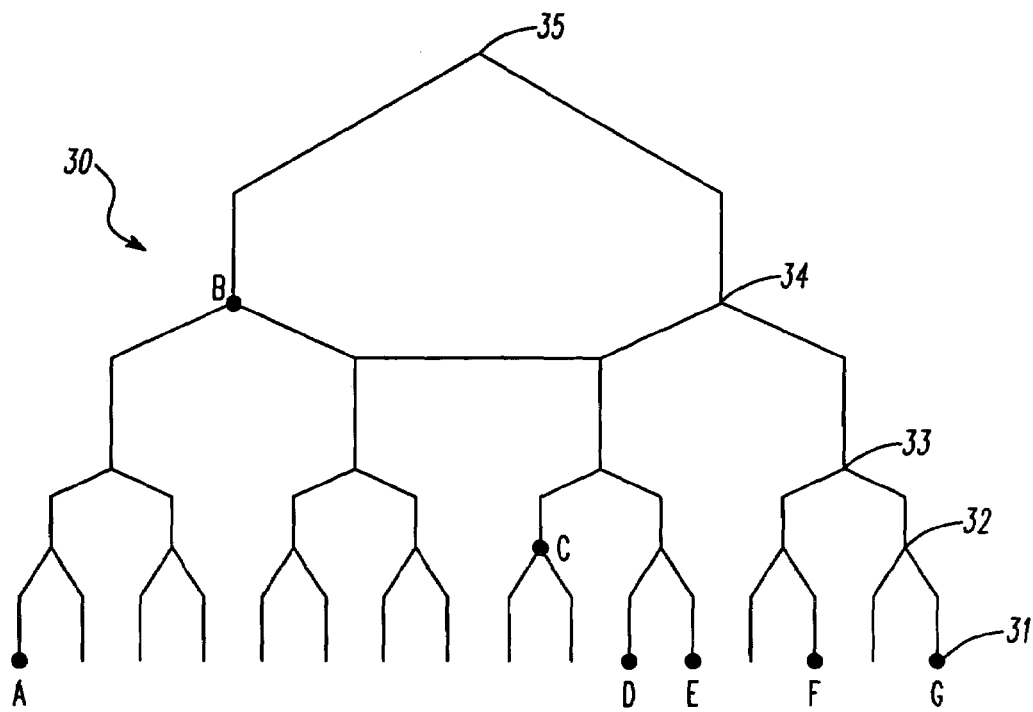
FIG. 3 comprises a schematic view of a Walsh code leg tree.

To further illustrate the Walsh code embodiments, the letters A–G of FIG. 3 represent potential wireless communication units seeking Walsh code leg assignments for the transmission of data. Units D–G have been assigned at level 31, the smallest throughput capacity Walsh code leg assignments. These units consume the least amount of throughput capacity but block the assignment of the Walsh code legs directly above them on the tree 30. Because most of the lower branches are assigned, there is little wasted throughput capacity. This assignment arrangement is particularly appropriate where units D–G only need the lesser throughput capacity available at level 31. Unit C is assigned to a leg one level higher at level 32 than units D–G. This assignment is appropriate because unit C filled the highest level leg available on that side of the tree 30 due to the assignment of units D–G at the lowest levels of that Walsh code tree 30 branch and because unit C only needs slightly more transmission capacity than units D–G.

A problem arises when a wireless communication unit needs a higher throughput capacity and no Walsh code legs are available for assignment at higher levels because of the assignment of Walsh code legs at the lower levels. For example, if unit B needs the throughput capacity of level 34 as seen on FIG. 3, then the assignment of unit A at level 31 will block unit B from using that higher capacity Walsh code leg. Thus, a Walsh code monitor can detect the assignment of unit A to a lower level Walsh code where few to none of the other lower level Walsh code legs in that branch of the tree 30 are assigned. After detecting this assignment pattern, the inactivity timer for unit A can be reduced so the lower legs are more quickly opened thereby allowing for the use of the higher level Walsh code legs for higher capacity users such as for unit B.

Another resource that is optionally monitored is the allocation of channel elements ("CE"). CE's are known in the art as access points for wireless communication unit modems. After detecting the number of CE's being used by a wireless communication unit, the inactivity timer will tend to be shortened for those wireless communication units consuming more CE's than a predetermined amount such as, for example, an average number of CE's used per unit within a system cell.

Similarly, the inactivity timer can be modified depending on the type of transport path used by a wireless communication unit. For example, a wireless communication unit may use a data control channel ("DCCH") to transmit data. A DCCH does not transmit data when there is silence between the wireless communication unit and the wireless communication system. In contrast, a wireless communication unit may use a fundamental channel ("FCH") that does transmit background data such as background noise during a voice transmission when otherwise there is silence. Because the FCH sends data corresponding to background noise when there is otherwise only silence, the FCH consumes more unit and system resources while in an active mode. Thus, the inactivity timer for a wireless communication unit using an FCH will tend to be shortened in a preferred approach to conserve those resources whereas a wireless communication unit using a DCCH may tend to be lengthened (or simply maintained) because it is using fewer resources while in an active mode.

Further, a wireless communication unit may use a power control sub-channel. A power control sub-channel, like a DCCH, does not transmit data when there is silence between the wireless communication unit and the wireless communication system. Such power control sub-channels, however, typically use less Walsh code space than does a DCCH. Thus, the inactivity timer for a wireless communication unit using a DCCH will tend to be shortened relative to the inactivity timers for wireless communication units using a power control sub-channel.

Additionally, the inactivity timer can be modified in response to the type of radio configuration ("RC") channel used by a wireless communication unit. To illustrate the possibilities, it would be helpful to briefly describe three types of forward RC configurations. An RC3 connection will typically use fewer radio frequency ("RF") resources but always more Walsh code resources when compared to an RC4 connection. An RC5 connection will often use more RF resources than an RC3 or RC4 connection and just as many Walsh code legs as RC3 resulting in almost always more resource consumption than the RC3 and RC4 connections, due to the higher user bit rate possible with RC5.

To best allocate the resources of a system using RC3, RC4, and RC5 connections in accord with a preferred approach, the inactivity timers for the wireless communication units in the system are typically adjusted as follows. Because the RC5 connection almost always consumes the most resources, the inactivity timers for wireless communication units using this connection in the active mode will tend to be shortened relative to inactivity timers for wireless communication units using RC3 and RC4 connections. If a system is more heavily loaded in RF versus Walsh code resources, the inactivity timers for wireless communication units using RC4 connections will tend to be shortened relative to units using RC3 connections because the RC4 connections consume more RF resources. In turn, if a system is more heavily loaded in Walsh code resources, the inactivity timers for wireless communication units using RC3 connections will tend to be shortened versus units using RC4 connections because the RC3 connections consume more Walsh code resources than RC4 connections.

The example regarding RC3 and RC4 connections also illustrates an embodiment wherein an extra monitoring step is taken before setting an inactivity timer. As seen in FIG. 2, at least one wireless communication system specific parameter may be monitored 22 as likely corresponds to the communication transport path circumstance for at least one wireless communication unit. The inactivity timer is then set 21 as a function at least in part of the wireless communication system specific parameter. To illustrate, in the RC3 and RC4 connection example the system loads for RF and Walsh code resources are monitored and the inactivity timer is shortened or lengthened for the RC3 or RC4 connections depending on the monitored system loads. It should be understood that other system specific parameters may be monitored 22 and used to help set 21 the inactivity timer.

Optionally, the inactivity timer can be set 21 after checking 23 a fairness parameter setting in addition to monitoring 20 unit specific parameters and/or monitoring 22 system specific parameters. In accordance with various embodiments of the invention, a fairness parameter is a measure of how much an inactivity timer will be biased for a given wireless communication unit. Fairness, as it is known in the art, generically refers to how equitably resources, typically data rates, are allocated among users. For example, the fairness parameter for a wireless communication system can vary between 0 and 1 where a setting of 0 is "completely fair" and setting of 1 is "completely unfair." A completely fair setting means that the inactivity timer for all wireless communication units within a given system will have the same setting. A completely unfair setting means that the inactivity timers for the wireless communication units will be biased to strongly favor the more efficient connections over the least efficient connections. In other words, with a fairness setting favoring an unfair distribution of resources, the inactivity timer will be increased for the more efficiently connected wireless communication units whereas the inactivity timer for the less efficiently connected wireless communication units will be decreased.

To determine whether a wireless communication unit is efficiently connected, the monitored unit specific parameter can be compared to the average for that parameter within a given system or cell. If the monitored unit specific parameter indicates that fewer resources (e.g. resource usage, potential throughput, Walsh codes, CEs, and so forth) are being used by that unit compared to the average for that parameter within the system or cell, the inactivity timer for that unit will be proportionally lengthened resulting in fewer connection delays. Similarly, if the monitored unit specific parameter indicates that more resources are being used by that unit compared to the average for that parameter within the system or cell, the inactivity timer for that unit will be proportionally shortened resulting in conserved resources. Thus, in this embodiment, an average inactivity timer for the units within the system or cell may be maintained while optimizing the allocation of resources.

The fairness parameter setting can be set by the user of a wireless communication unit such that the particular unit will be biased for either a longer or shorter inactivity timer depending on the efficiency of its connection. For instance, a user may trade "fairness" for the likelihood of obtaining a connection with a larger bandwidth. The fairness parameter may also be set by the wireless communication system and vary according to system conditions.

Figure 4:
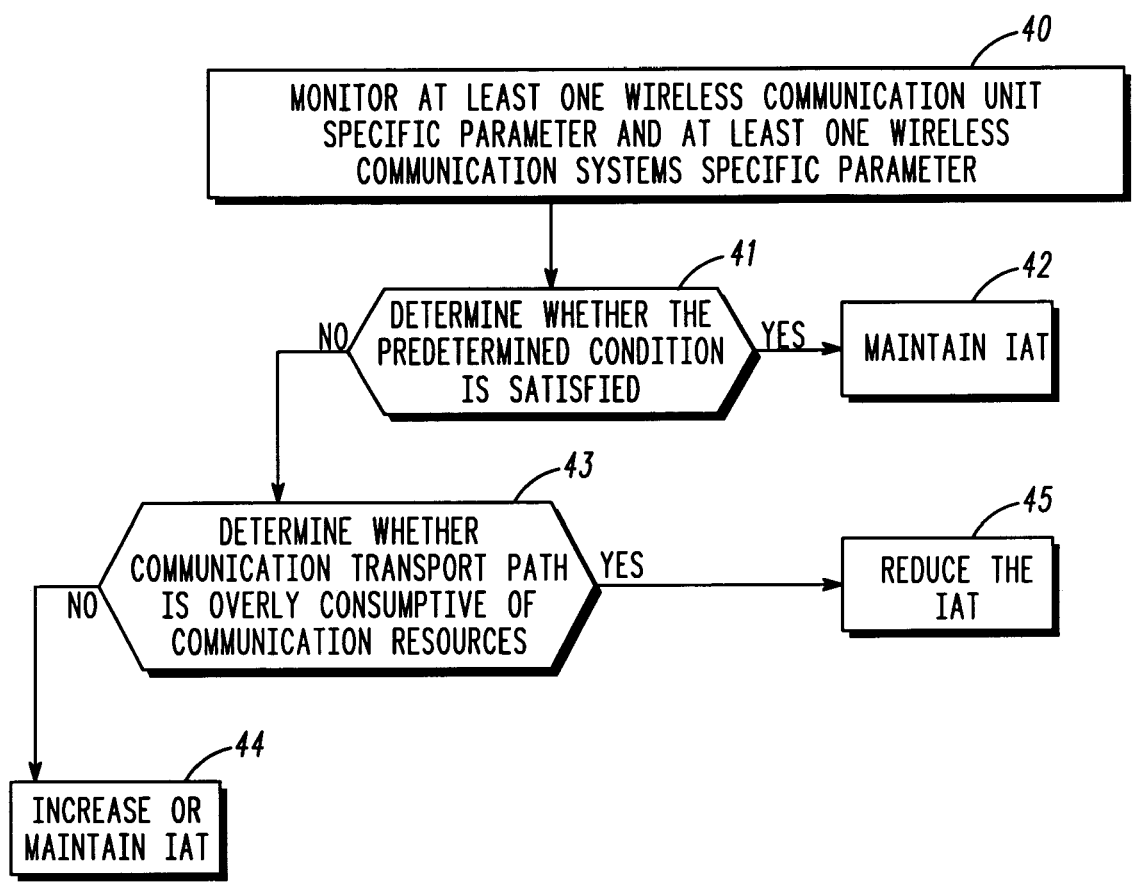
FIG. 4 comprises a flow diagram as configured in accordance with an embodiment of the invention.

In a preferred embodiment as illustrated in FIG. 4, the inactivity timer will be maintained 42 if a predetermined condition is satisfied 41 in connection with at least one wireless communication unit. In this embodiment, one or more wireless communication unit specific and system specific parameters are monitored 40. Then, the satisfaction of the predetermined condition is determined 41. If the predetermined condition is satisfied 41, the inactivity timer is maintained 42. If the predetermined condition is not satisfied 41, it is determined 43 whether the communication transport path is overly consumptive of communication resources. If the transport path is overly consumptive of resources, the inactivity timer is reduced 45, whereas if the transport path is not overly consumptive of resources, the inactivity timer is increased or maintained 44. For example, if a wireless communication unit is consistently located at the edge of a cell and thereby consuming more resources than other units located closer to the cell tower, the inactivity timer for that unit will tend to be shortened 45 whereas the inactivity timer for more efficient units is increased or maintained 44. If this unit, however, meets a predetermined condition, such as consistently needing a certain level of bandwidth over a certain amount a time, the inactivity timer for that unit will not be shortened. Thus, certain units that consistently consume more resources, thereby triggering a lowered inactivity timer, may meet certain conditions allowing these units to not enter a dormant mode more often than is necessary.

One should note that the preferred embodiment of FIG. 4 can be modified in several ways. For instance, the step of determining 41 whether the predetermined condition is satisfied may be taken after determining 43 that the transport path is overly consumptive of communication resources.

Similarly, those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the various alternative steps may be performed in any sequence before setting the inactivity timer. Also, any number of unit specific parameters may be individually or collectively monitored and weighed before setting the inactivity timer. Thus, the invention should not be limited to the above described embodiments.

We claim:

1. A method comprising
monitoring at least one wireless communication unit specific-parameter as likely corresponds to a communication transport path circumstance for a given wireless communication unit;
setting an inactivity timer as a function, at least in part, of the at least one wireless communication unit specific-parameter and at least one fairness parameter setting wherein the fairness parameter refers to how resources will be equitably allocated among the given wireless communication unit and other wireless communication units.

2. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to at least one communication resource usage parameter.

3. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path experience for a given wireless communication unit.

4. The method of claim 3 wherein monitoring at least one wireless communication unit specific-parameter as likely corresponds to a communication transport path experience for a given wireless communication unit further comprises monitoring at least one wireless communication unit specific-parameter as likely corresponds to a communication transport path experience comprising monitoring signal strength of transmissions as pertain to communications with the given wireless communication unit.

5. The method of claim 3 wherein monitoring at least one wireless communication unit specific-parameter as likely corresponds to a communication transport path experience for a given wireless communication unit further comprises monitoring at least one wireless communication unit specific-parameter as likely corresponds to a communication transport path experience comprising error rates of transmissions as sourced by the given wireless communication unit.

6. The method of claim 3 wherein monitoring at least one wireless communication unit specific-parameter as likely corresponds to a communication transport path experience for a given wireless communication unit further comprises monitoring at least one wireless communication unit specific-parameter as likely corresponds to a communication transport path experience comprising error rates of transmissions as received by the given wireless communication unit.

7. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising a handoff rate as corresponds to the given wireless communication unit.

8. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising a number of Walsh codes as are allocated for use by the given wireless communication unit.

9. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising a potential throughput capacity as is associated with at least one Walsh code as is allocated for use by the given wireless communication unit.

10. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising a potential throughput capacity as is associated with at least one communication system resource as is allocated for use by the given wireless communication unit.

11. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising at least one channel element as is allocated for use by the given wireless communication unit.

12. The method of claim 1 wherein monitoring at least one wireless communication unit specific-parameter as likely corresponds to a communication transport path circumstance for a given wireless communication unit further comprises monitoring at least one wireless communication unit specific-parameter as likely corresponds to a communication transport path circumstance comprising a type of transport path as is allocated for use by the given wireless communication unit.

13. The method of claim 12 wherein monitoring at least one wireless communication unit specific-parameter as likely corresponds to a communication transport path circumstance comprising a type of transport path as is allocated for use by the given wireless communication unit further comprises determining when the communication transport path circumstance comprises any of:
- a data control channel;
- a fundamental channel;
- a power control sub-channel;
- a radio configuration 3 type channel;
- a radio configuration 4 type channel;
- a radio configuration 5 type channel.

14. The method of claim 1 wherein setting an inactivity timer as a function, at least in part, of the at least one wireless communication unit specific-parameter further comprises reducing the inactivity timer from a nominal value.

15. The method of claim 1 wherein setting an inactivity timer as a function, at least in part, of the at least one wireless communication unit specific-parameter further comprises increasing the inactivity timer from a nominal value.

16. The method of claim 1 wherein setting an inactivity timer as a function, at least in part, of the at least one wireless communication unit specific-parameter further comprising setting an inactivity timer as a function, at least in part, of the at least one wireless communication unit specific-parameter such that the inactivity timer tends to be shortened when the communication transport path circumstance for a given wireless communication unit is sufficiently consumptive of at least one communication resource to thereby conserve power consumption of the wireless communication unit.

17. The method of claim 16 and further comprising:
detecting a predetermined condition with respect to the at least one wireless communication unit and in response to the predetermined condition not tending to shorten the inactivity timer notwithstanding a communication transport path circumstance that is sufficiently consumptive of at least one communication resource.

18. The method of claim 1 and further comprising:
monitoring at least one wireless communication system specific-parameter as likely corresponds to the communication transport path circumstance for the at least one wireless communication unit;
setting the inactivity timer as a function, at least in part, of the at least one wireless communication system specific-parameter.

19. An apparatus comprising:
a wireless communication unit communication transport path circumstance monitor;
a wireless communication system inactivity timer that is responsive to the wireless communication unit communication transport path circumstance monitor and at least one fairness parameter wherein the fairness parameter refers to how resources will be equitably allocated among the given wireless communication unit and other wireless communication units.

20. The apparatus of claim 19 wherein the wireless communication unit communication transport path circumstance monitor comprises a Walsh code usage monitor.

21. The apparatus of claim 19 wherein the wireless communication unit communication transport path circumstance monitor further comprises a channel type monitor.

22. The apparatus of claim 19 wherein the wireless communication unit communication transport path circumstance monitor further comprises a power monitor.

23. The apparatus of claim 19 wherein the wireless communication system inactivity timer further comprises duration setting means for selecting a particular inactivity duration to use with a given wireless communication unit.

24. The apparatus of claim 23 wherein the duration setting means is further for selecting a particular inactivity duration that reduces the inactivity duration for at least some wireless communication units that are experiencing poor transport path performance.

25. A method comprising:
monitoring at least one wireless communication unit specific-parameter as likely corresponds to a communication transport path circumstance for a given wireless communication unit;
setting an inactivity timer as a function, at least in part, of the at least one wireless communication unit specific-parameter such that the inactivity timer tends to be shortened when the communication transport path circumstance for a given wireless communication unit is sufficiently consumptive of at least one communication resource to thereby conserve power consumption of the wireless communication unit, and
detecting a predetermined condition with respect to the at least one wireless communication unit and in response to the predetermined condition not tending to shorten the inactivity timer notwithstanding a communication transport path circumstance that is sufficiently consumptive of at least one communication resource.

* * * * *